(12) United States Patent
Aughton

(10) Patent No.: US 10,578,112 B2
(45) Date of Patent: Mar. 3, 2020

(54) PIPELINE SYSTEM FOR FLUIDS

(71) Applicant: Rubicon Research Pty Ltd, Hawthorn, Victoria (AU)

(72) Inventor: David John Aughton, Hawthorn (AU)

(73) Assignee: RUBICON RESEARCH PTY LTD, Victoria (AU)

( * ) Notice: Subject to any disclaimer, the term of this patent is extended or adjusted under 35 U.S.C. 154(b) by 456 days.

(21) Appl. No.: 14/648,689

(22) PCT Filed: Nov. 26, 2013

(86) PCT No.: PCT/AU2013/001368
§ 371 (c)(1),
(2) Date: May 29, 2015

(87) PCT Pub. No.: WO2014/082121
PCT Pub. Date: Jun. 5, 2014

(65) Prior Publication Data
US 2015/0301534 A1 Oct. 22, 2015

(30) Foreign Application Priority Data

Nov. 30, 2012 (AU) ................................ 2012905225
Dec. 17, 2012 (AU) ................................ 2012905508

(51) Int. Cl.
*F04D 15/00* (2006.01)
*F04D 3/02* (2006.01)
(Continued)

(52) U.S. Cl.
CPC .......... *F04D 15/0005* (2013.01); *F04D 3/02* (2013.01); *F04D 15/0027* (2013.01);
(Continued)

(58) Field of Classification Search
CPC ..... F04D 3/00; F04D 3/02; F04D 3/06; F04D 27/004; F04D 13/16; F04D 15/0005;
(Continued)

(56) References Cited

U.S. PATENT DOCUMENTS 4,200,911 A 4/1980 Matsumoto
4,209,131 A 6/1980 Barash et al.
(Continued)

FOREIGN PATENT DOCUMENTS

WO 2013016769 A1 2/2013

OTHER PUBLICATIONS

Examination Report No. 4 dated Jul. 21, 2017, for Corresponding AU Application No. 2013351909.
(Continued)

*Primary Examiner* — Bryan M Lettman
*Assistant Examiner* — Charles W Nichols
(74) *Attorney, Agent, or Firm* — David D. Brush; Westman, Champlin & Koehler, P.A.

(57) ABSTRACT

The invention provides method and system of controlling flow rate in a pipeline network for fluids. The system includes a demand management system to monitor fluid flow rate in the pipeline network (10) and a pump (34) to increase the fluid flow rate when the demand management system determines an increase in fluid flow rate is required.

12 Claims, 4 Drawing Sheets

(51) Int. Cl.
*F04D 15/02* (2006.01)
*G05D 7/00* (2006.01)

(52) U.S. Cl.
CPC ......... *F04D 15/0066* (2013.01); *F04D 15/02* (2013.01); *F04D 15/0209* (2013.01); *F04D 15/0227* (2013.01); *G05D 7/00* (2013.01)

(58) Field of Classification Search
CPC ............. F04D 15/0027; F04D 15/0038; F04D 15/0066; F04D 15/02; F04D 15/0209; F04D 15/0227; F04D 27/0261; F04C 3/00; F04C 3/02; F04C 3/06; F04C 14/08; F04C 14/18; F04C 14/24; F04C 28/08; F04C 28/24; F04C 28/18; F04C 29/12; F04C 2270/58; F04C 2270/585; F04C 2270/806; F04C 14/26; G01M 3/28; E03B 3/10; E03B 3/11; E03B 7/07; E03B 7/078; E03B 7/075; E03B 11/16; G05D 7/00–0694
See application file for complete search history.

(56) References Cited

U.S. PATENT DOCUMENTS

| | | | | |
|---|---|---|---|---|
| 4,381,645 A * | 5/1983 | Galuska | ............... | F03B 13/086 137/147 |
| 4,867,192 A | 9/1989 | Terrell et al. | | |
| 5,788,466 A * | 8/1998 | Thompson | ............ | F04D 29/605 239/724 |
| 7,632,040 B2 * | 12/2009 | Cripps | ...................... | E02B 9/00 290/1 R |
| 8,007,249 B2 * | 8/2011 | Spargo | ...................... | F04D 3/00 417/231 |
| 2008/0082215 A1 * | 4/2008 | McDowell | ................ | F17D 3/01 700/282 |
| 2010/0305763 A1 | 12/2010 | Ferber et al. | | |

OTHER PUBLICATIONS

Elmandi, A. et al., "System Dynamics Optimisation Approach to Irrigation Demand Management" MODSIM 2005 International Congress on Modelling and Simulation, Modelling and Simulation Society of Australia and New Zealand, Dec. 2005, pp. 196-202.
International Application No. PCT/AU2013/001368, International Search Report and Written Opinion dated Feb. 14, 2014.
Australian Patent Application No. 2013351909, Examination Report No. 1 dated Dec. 22, 2016.
Australian Patent Application No. 2013351909, Examination Report No. 2 dated May 3, 2017.
European Patent Application No. 13858462.8, Search Report dated Aug. 2, 2016.
Daccache, A. et al., "On-Demand Pressurized Water Distribution System Impacts on Sprinkler Network Design and Performance," Irrigation Science, vol. 28, No. 4, pp. 331-339, May 2010 [published online on Oct. 17, 2009].
Jimenez-Bello, M. A. et al., "Methodology for Grouping Intakes of Pressurised Irrigation Networks into Sectors to Minimise Energy Consumption," Biosystems Engineering, vol. 105, No. 4, pp. 429-438, Apr. 2010 [published online on Feb. 10, 2010].
Phocaides, A., "Technical Handbook on Pressurized Irrigation Techniques," Food and Agriculture Organization of the United Nations, Aug. 1, 2000.

* cited by examiner

PIPELINE SYSTEM FOR FLUIDS

FIELD OF THE INVENTION

The present invention relates to a pipeline system for fluids and relates particularly, but not exclusively to controlling flow rate in a gravity fed irrigation pipeline system.

CROSS-REFERENCE TO RELATED APPLICATIONS

This application is a national stage application pursuant to 35 U.S.C. § 371 of International Application No. PCT/AU2013/001368, filed Nov. 26, 2013, which claims priority to Australian Patent Application No. 2012905225, filed Nov. 30, 2012 and Australian Patent Application No. 2012905508, filed Dec. 17, 2012, the disclosures of which are hereby incorporated by reference herein.

BACKGROUND OF THE INVENTION

Traditionally pipeline fluid networks are energized by a source such as a pump. The energy supplied by the pump is often at a pressure head that ensures the hydraulic performance from the system such as required flows and pressures are more than adequately accommodated. These systems are often designed with the criterion that pressure levels should be over and above maximum design requirements.

Low energy or gravity fed pipelines, on the other hand, need to operate within the capacity of a limited supply pressure head. As described in our International Patent Application PCT/AU2012/000907 (the entirety of which is herein incorporated), the use of a demand management system in combination with real-time control is described allowing for the tight management of demand to ensure that the system operates within the supply pressure head, but does not exceed it. The use of a combined flow meter and bi-foldable valve member as described in our International Patent Application PCT/AU2012/000328 (the entirety of which is herein incorporated), provides a configuration enabling one or more supply points as outlets from the pipe network. These supply points can then be connected to a real-time monitoring (flow and valve opening) and control (valve operation) SCADA (Supervisory Control and Data Acquisition) system similar in operation to that described in U.S. Pat. No. 7,152,001 (the entirety of which is herein incorporated). It would be expected that head conditions for the supply and delivery points of the pipe network be subject to some variation.

OBJECTS OF THE INVENTION

It is an object of the invention to provide a method and system to have the ability to control flows at the outlets in order to manage within limited head conditions and avoid any compounding interactions from these head variations.

A further object of the invention is to provide a method and system where pipelines can operate under gravity and can be assisted to meet additional pressure demands.

SUMMARY OF THE INVENTION

The present invention in one aspect provides a method of controlling flow rate in a gravity fed or pressurised pipeline network for fluids, said method including the steps of monitoring fluid flow rate in said pipeline network and increasing said fluid flow rate when said monitoring step determines an increase in fluid flow rate is required.

Preferably a pump is provided in said pipeline network, said pump being switchable between pumping and non-pumping modes by a demand management system providing said monitoring of fluid flow rate in said pipeline network.

In a preferred embodiment at least one fluid control gate is provided at an inlet of said pipeline network, said at least one fluid control gate being movable between open and closed positions under control of said demand management system.

In a practical embodiment said pump is an Archimedes screw type pump in said pipeline network allowing fluid to flow therethrough when said pump is in the non-pumping mode.

In a further preferred aspect of the invention said pipeline network includes at least one main pipeline and a branch pipeline leading into said at least one main pipeline at one end and opening into a source of fluid to be pumped at the other end, said method further including the steps of installing said pump in said branch pipeline to allow said pump to force fluid under pressure into said at least one main pipeline in said pumping mode.

Preferably said demand management system closes said at least one fluid control gate whilst said pump is in said pumping mode.

In a further aspect of the invention there is provided a system of controlling flow rate in a gravity fed or pressurised pipeline network for fluids, said system including a demand management system to monitor fluid flow rate in said pipeline network and a pump to increase said fluid flow rate when said demand management system determines an increase in fluid flow rate is required.

BRIEF DESCRIPTION OF THE DRAWINGS

The structure and functional features of preferred embodiments of the present invention will become more apparent from the following detailed description when taken in conjunction with the accompanying drawings, in which.

DESCRIPTION OF THE PREFERRED EMBODIMENTS

Figure 1:
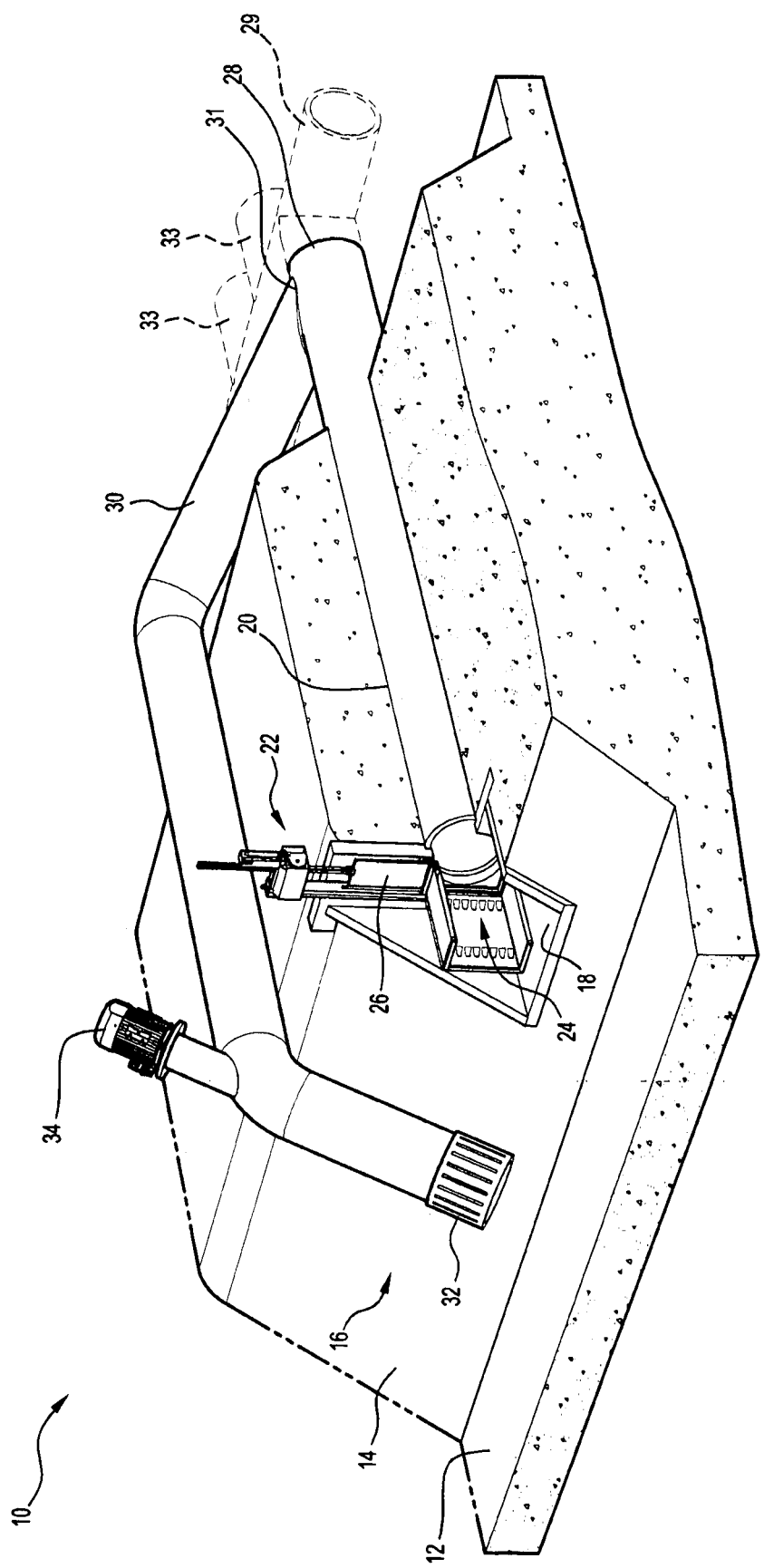
FIG. 1 is a perspective partial cross-sectional view of an irrigation system in accordance with a first embodiment of the invention showing an undershot gate with the gate open and showing the flow of water through the gate in the unpressurized state.

In order to avoid duplication of description, identical reference numerals will be shown, where applicable, throughout the illustrated embodiments to indicate similar integers.

The embodiments describe the configuration of a pipeline network to exploit situations where there is limited available pressure head supplying water to the network and where pipelines operate under gravity and are supplied by reservoirs such as an open channel system. The invention is not limited to environments where pipelines operate under gravity as it is also applicable to pumped or pressurised pipeline networks.

FIG. 1 shows an irrigation system 10 having a main open channel 12 for flow of water under gravity. The open channel 12 has angled sidewalls, of which only one 14, is shown. Water flows in the direction of arrow 16 and enters one or more inlets 18. Inlet 18 opens into a pipeline 20 through undershot gate 22 and flow measurement device 24. The flow measurement device 24 is optional as flows can be measured elsewhere in the irrigation system 10. The construction and operation of the undershot gate 22 and flow measurement device 24 is fully described in FIGS. 28 to 36 of International Patent Application No. PCT/AU2010/001052 (the entirety of which is herein incorporated). This type of gate is preferred as it includes double seals as described which provides a barrier to flow either side of gate leaf 26. It is evident to the man skilled in the art that the invention is not limited to such a gate construction and that other types of gates could be utilized. Water enters inlet 18 and flows through flow measurement device 24 and undershot gate 22 to exit through pipeline 20. The exit 28 is typically coupled to a further pipeline 29 of and the further pipeline 29 has supply points 33 along its length for distribution of water to consumers. Each supply point 33 would preferably include a combined flow meter and bi-foldable valve member (not shown) as described in our International Patent Application PCT/AU2012/000328. Such a flow meter immediately upstream of the bi-foldable valve is possible due to the symmetrical velocity profile created by the bi-foldable valve member. These valves are a cost effective means of both controlling and measuring flow with minimal head loss, which is critical in these low head applications. Fluid head loss through a pipe fitting can be calculated by the following equation:

$$h = K \times v^2 / 2g$$

where
h=pressure loss in terms of fluid head, i.e. fluid head loss
K=manufacturer's published 'K' factor for the fitting
v=velocity of fluid
g=acceleration due to gravity The combined valve and meter has low energy loss because (i) it is suited to large diameter pipes, therefore large cross-sectional area; and therefore low velocity; and (ii) low K factor due to hydraulic characteristics of the valve design.

Supply points 33 can then be connected to a real-time monitoring (flow and valve opening) and control (valve operation) SCADA system (not shown), similar in operation to that described in U.S. Pat. No. 7,152,001 and a demand management system (not shown) of the type described in our International Patent Application PCT/AU2012/000907. As previously described in U.S. Pat. No. 7,152,001 a model of the pipeline would be tuned using data from the SCADA system using the Systems Identification technique also described in U.S. Pat. No. 7,152,001.

Figure 2:
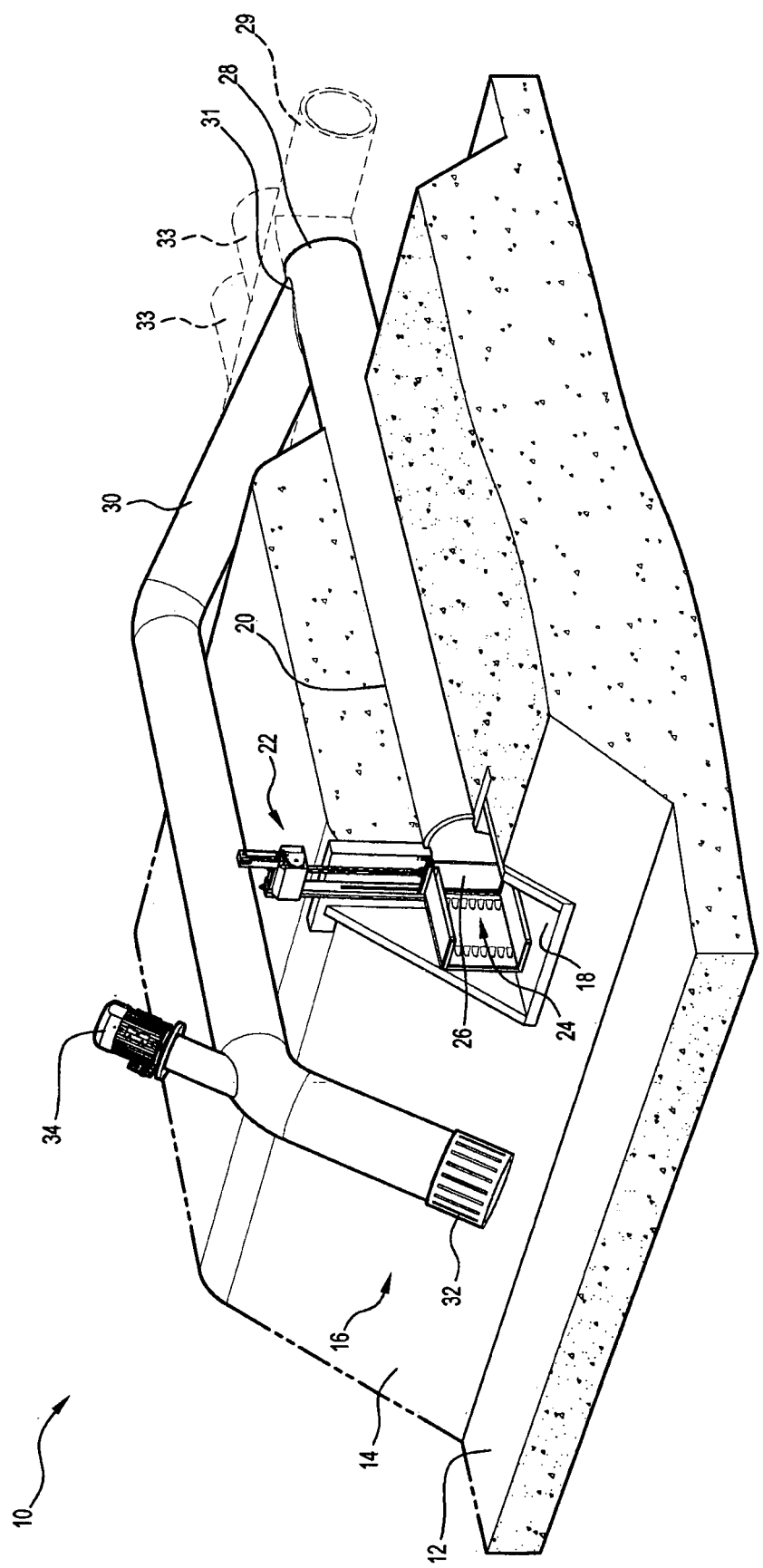
FIG. 2 is a similar view to that of FIG. 1 with the undershot gate closed and showing the flow of water in the pressurized state.

Typically, gravity supply of water along open channel 12 will satisfy much of the required demand from the pipeline 20. However during small peak periods an additional pressure head is required. A pipeline 30 opens into pipeline 20 at 31 to provide pressurized water when required. Pipeline 30 has an inlet 32 opening into the open channel 12 below water level. A low head lift pump 34 can directly inject pressurized water into pipeline 30 with the suction side 32 of the pump taking water from open channel 12 with the delivery side of the pump connecting to low energy pipeline 20 through the connection at 31 to pipeline 20. The gate 22 will act as a flow control device when operating under gravity supply mode as shown in FIG. 1. The gate leaf 26 would close off the pipeline entrance 18, as shown in FIG. 2, when pump 34 operates, ensuring the pump pressure is maintained in the pipelines 20, 30. No water will enter pipe 20 through gate 22. Gate 22 has the ability to act as a sealing barrier to pressure from both sides of gate leaf 26 due to the double seal mechanism as previously described. Pump 34 will cease to operate when the demand management and control system determines that the demand has passed and gate leaf 26 will be raised so water flow only occurs through pipeline 20.

Figure 3:
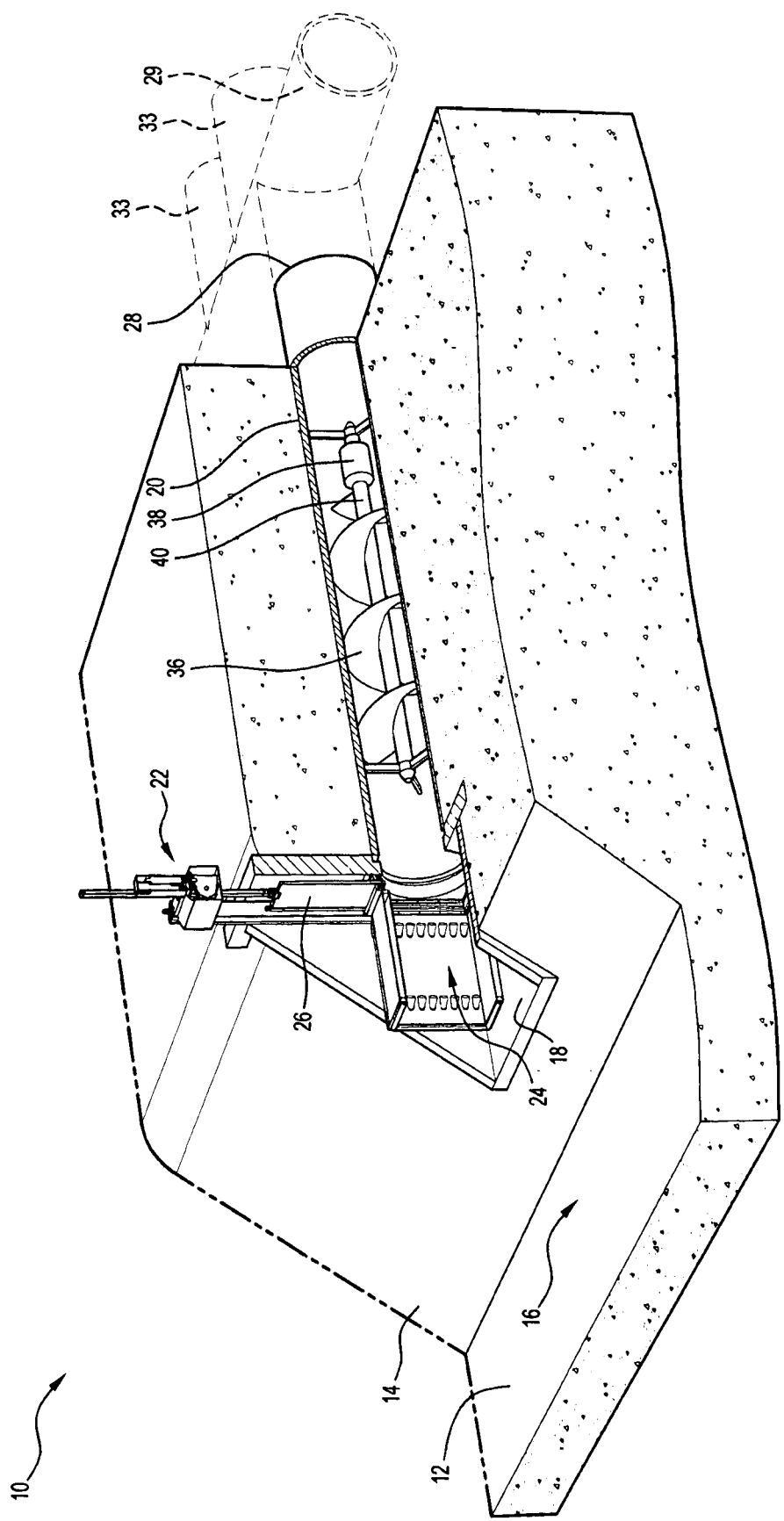
FIG. 3 is perspective partial cross-sectional view of an irrigation system in accordance with a second embodiment of the invention showing an undershot gate with the gate open and showing the flow of water through the gate in the unpressurized state.

The embodiment shown in FIG. 3 is similar to the embodiment shown in FIGS. 1 and 2 but is simplified with the omission of pipeline 30 and pump 34. The inclusion/insertion of an axial screw pump mechanism 36 within pipeline 20. The axial screw concept is equivalent to the known concept of an 'Archimedes' Screw' and used commercially in axial lift pumps. The screw mechanism 36 is located axially within the pipeline 30 and is connected to an electrical motor 38. It is preferred to have the motor 38 directly coupled to and in-line with the screw's axial drive shaft 40. The motor 38 would be sealed to prevent ingress of water. In gravity supply mode, the screw pump mechanism 36 would 'free-wheel' with minimal resistance and therefore minimal energy loss under gravity. In the activated pumping mode, the motor would drive the screw mechanism 36 which in turn would result in added energy and pressure to the water in the pipe 20 downstream of the screw pump mechanism 36.

Figure 4:
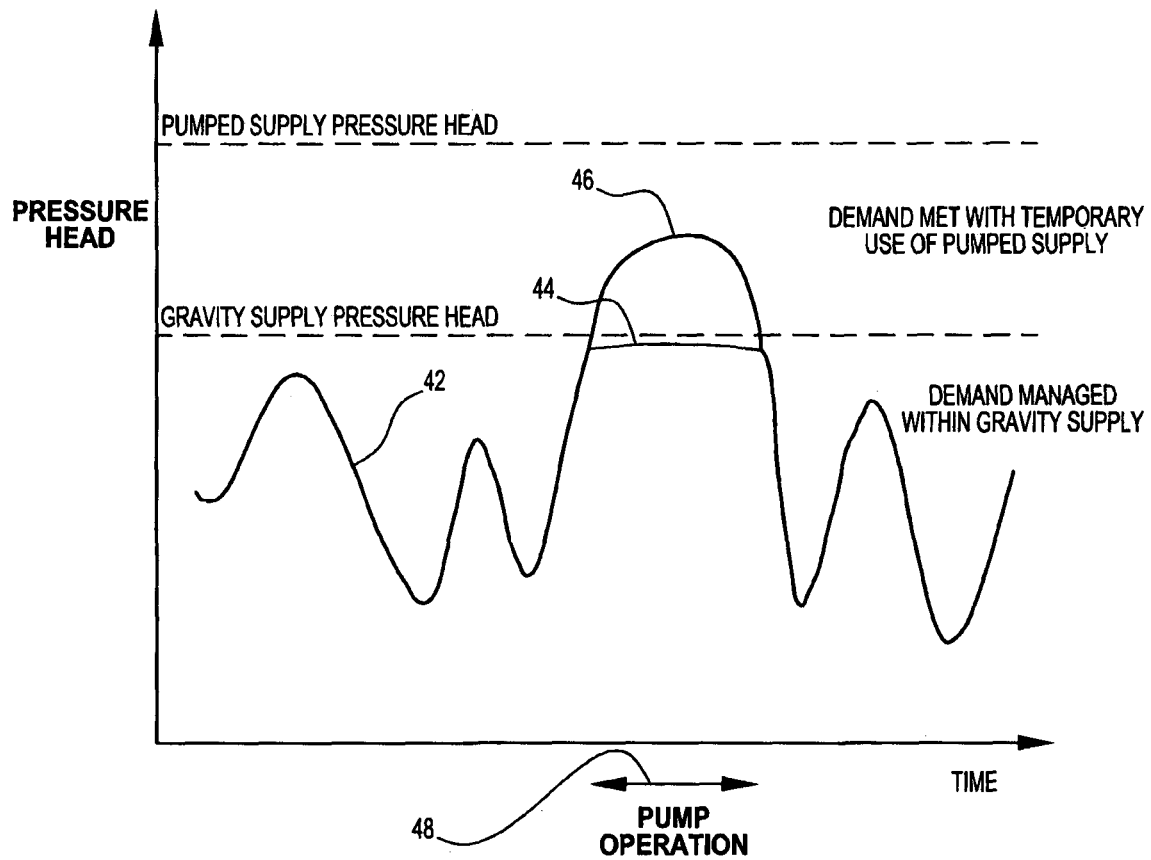
FIG. 4 is a graph of the pressure head against time for operation of the irrigation system.

The operation of the systems shown in FIGS. 1 to 3 is shown in the graph of FIG. 4. The graph shows the demand for the majority of the time can be met from the gravity supply pressure head as indicated by line 42. If the demand exceeds the gravity supply pressure head indicated by the plateau indicated by line 44, the option is to either re-schedule the demand so that it does not exceed the gravity pressure head, or alternatively, invoke the pumping systems 34, 36 for this period of time. The effect of the invoking of the pumping systems 34, 36 are shown by line 46. The time of operation is indicated by arrows 48 on the time line of the graph. This option may also be presented to a user of the system where a higher tariff could be charged if the pump option was selected.

This invention describes a combined gravity and pressurized pipeline system where the pumped pressure supply is an adjunct to the gravity system and is only invoked when additional pressure head, is required. The demand management and control system ensures the desired operation of the auxiliary pump facility only during prescribed peak requirements.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. An irrigation pipeline system for supplying and controlling a flow rate of irrigation water from an open channel, the supplying and controlling being to satisfy demand for the irrigation water, the system including:
   a main pipeline having an inlet, which is coupled to the open channel to receive the irrigation water by gravity, fed by the open channel at a gravity supply pressure head;

a gate along the main pipeline;
at least one irrigation supply point supplied by an exit of the main pipeline;
a branch pipeline bypassing the gate, which has an inlet fluidically coupled to the open channel, below a water level of the irrigation water, and which has an outlet that supplies the at least one irrigation supply point, downstream of the gate;
a pump for pumping water along the branch pipeline;
a gravity supply mode in which the main pipeline feeds the irrigation water by gravity to the at least one irrigation supply point;
an active pumping mode in which the gate is closed and the pump feeds the irrigation water along the branch pipeline to the at least one irrigation supply point at a higher pressure than when fed by gravity in the gravity supply mode; and
a demand management system configured to:
monitor the flow rate of the irrigation water along the irrigation pipeline system when the system is gravity fed in the gravity supply mode;
determine when demand for irrigation water through the at least one irrigation supply point is greater than the gravity supply pressure head and that an increase in flow rate is required to satisfy a peak demand;
when the demand management system determines that an increase in flow rate is required, switching the irrigation pipeline system from the gravity supply mode to the active pumping mode by:
closing the gate; and
switching the pump from a non-pumping mode to a pumping mode, the pump injecting pressurized irrigation water to the irrigation pipeline system, downstream of the gate when in the pumping mode, and wherein the gate provides a sealing barrier to the pressurized irrigation water when the gate is closed;
determine when the peak demand has passed; and
when the demand management system so determines that the peak demand has passed, switching the irrigation pipeline system from the active pumping mode to the gravity supply mode by:
opening the gate; and
switching the pump from the pumping mode to the non-pumping mode so that the irrigation water is fed only through the main pipeline by gravity.

2. The irrigation pipeline system of claim 1 including a flow meter along the main pipeline.

3. The irrigation pipeline system of claim 1 wherein the gate is an undershot gate.

4. The irrigation pipeline system of claim 2 wherein the gate is an undershot gate.

5. An irrigation system including:
an irrigation pipeline system for supplying and controlling a flow rate of irrigation water from an open channel; and
a further pipeline coupled to an exit of the irrigation pipeline system and having irrigation supply points along its length for distribution of irrigation water to consumers to satisfy demand for the irrigation water;
the irrigation pipeline system including:
a main pipeline having an inlet, which is coupled to the open channel to receive the irrigation water by gravity, fed by the open channel at a gravity supply pressure head;
a gate along the main pipeline;
a branch pipeline bypassing the gate, which has an inlet fluidically coupled to the open channel, below a water level of the irrigation water, and which has an outlet that supplies the irrigation supply points, downstream of the gate;
a pump for pumping water along the branch pipeline;
a gravity supply mode in which the main pipeline feeds the irrigation water by gravity to the irrigation supply points;
an active pumping mode in which the gate is closed and the pump feeds the irrigation water along the branch pipeline to the irrigation supply points at a higher pressure than when fed by gravity in the gravity supply mode; and
a demand management system configured to:
monitor the flow rate of the irrigation water along the irrigation pipeline system when the system is gravity fed in the gravity supply mode;
determine when the demand for irrigation water is greater than the gravity supply pressure head and an increase in flow rate is required to satisfy a peak demand;
when the demand management system determines that an increase in flow rate is required, switching the irrigation pipeline system from the gravity supply mode to the active pumping mode by:
closing the gate; and
switching the pump from a non-pumping mode to a pumping mode, the pump injecting pressurized irrigation water to the irrigation pipeline system, downstream of the gate when in the pumping mode, and wherein the gate provides a sealing barrier to the pressurized irrigation water when the gate is closed;
determine when the peak demand has passed; and
when the demand management system determines that the peak demand has passed, switching the irrigation pipeline system from the active pumping mode to the gravity supply mode by:
opening the gate; and
switching the pump from the pumping mode to the non-pumping mode so that the irrigation water is fed only through the main pipeline by gravity.

6. The irrigation system of claim 5 including a flow meter along the main pipeline.

7. The irrigation system of claim 5 wherein the gate is an undershot gate.

8. The irrigation system of claim 6 wherein the gate is an undershot gate.

9. The irrigation system of claim 5 wherein each of the supply points has a combined flow meter and bi-foldable valve member.

10. The irrigation system of claim 6 wherein each of the supply points has a combined flow meter and bi-foldable valve member.

11. The irrigation system of claim 7 wherein each of the supply points has a combined flow meter and bi-foldable valve member.

12. The irrigation system of claim 8 wherein each of the supply points has a combined flow meter and bi-foldable valve member.

* * * * *